United States Patent [19]

Boatman et al.

[11] Patent Number: 5,538,748

[45] Date of Patent: Jul. 23, 1996

[54] PROCESS FOR MIXING FLUID MATERIALS

[75] Inventors: Jack K. Boatman; John T. Farnsworth; Roger D. Johnson, all of St. Joseph, Mo.; Linda A. Young, Roxbury, Conn.

[73] Assignee: Nestec S.A., Vevey, Switzerland

[21] Appl. No.: 537,306

[22] Filed: Sep. 29, 1995

Related U.S. Application Data

[62] Division of Ser. No. 188,437, Jan. 28, 1994, Pat. No. 5,486,049.

[51] Int. Cl.$^6$ ...................................................... A23P 1/00
[52] U.S. Cl. .......................... 426/516; 426/515; 426/519
[58] Field of Search ...................................... 426/516, 512, 426/515, 518, 519; 425/197, 208, 209; 366/175.2, 174.1, 340, 336

[56] References Cited

U.S. PATENT DOCUMENTS

| | | | |
|---|---|---|---|
| 3,064,680 | 11/1962 | Winslow | 366/340 |
| 3,307,503 | 3/1967 | Elmer, Jr. et al. | 426/516 |
| 3,575,352 | 4/1971 | Hall et al. | 239/434.5 |
| 3,667,732 | 6/1972 | Lejeune | 366/173 |
| 3,792,839 | 2/1974 | Gidge | 366/87 |
| 3,857,551 | 12/1974 | Troy | 366/336 |
| 3,936,382 | 2/1976 | White | 261/76 |
| 4,003,554 | 1/1977 | Chauffoureaux | 366/339 |
| 4,027,858 | 6/1977 | Dettmer | 425/DIG. 49 |
| 4,170,446 | 10/1979 | Schutz et al. | 366/337 |
| 4,198,168 | 4/1980 | Penn | 366/336 |
| 4,208,136 | 6/1980 | King | 366/338 |
| 4,249,877 | 2/1981 | Machen | 425/209 |
| 4,372,734 | 2/1983 | Dolan et al. | 366/336 |
| 4,382,684 | 5/1983 | Hori | 366/340 |
| 4,454,804 | 6/1984 | McCulloch et al. | 425/208 |
| 4,540,537 | 9/1985 | Kamp | 425/131.1 |
| 4,614,440 | 9/1986 | King | 366/336 |
| 4,616,779 | 10/1986 | Serrano et al. | 239/79 |
| 4,616,937 | 10/1986 | King | 366/336 |
| 4,753,535 | 6/1988 | King | 366/337 |
| 4,772,197 | 9/1988 | Heck | 425/199 |
| 4,808,007 | 2/1989 | King | 366/336 |
| 4,945,807 | 8/1990 | Loomans et al. | 366/77 |
| 5,030,465 | 7/1991 | Curry et al. | 426/519 |
| 5,110,276 | 5/1992 | Farnsworth et al. | 425/133.1 |
| 5,114,732 | 5/1992 | Major et al. | 426/519 |
| 5,120,554 | 6/1992 | Farnsworth et al. | 426/516 |

FOREIGN PATENT DOCUMENTS

| | | |
|---|---|---|
| 1230005 | 8/1987 | Canada . |
| 663974 | 4/1929 | France . |
| 935418 | 6/1948 | France . |
| 1261312 | 8/1961 | France . |
| 1304737 | 8/1962 | France . |
| 1704754 | 5/1971 | Germany . |
| 581493 | 11/1976 | Switzerland . |
| 725689 | 4/1980 | U.S.S.R. . |

OTHER PUBLICATIONS

Baker, "Motionless Miners Stir Up New Uses," Reprint of Chemical Engineering Progress, Jun. 1991, pp. 31–38.
Komax Systems, Inc. Product Brochure, "Equalizer—The Melt Stream Mixer That's Designed to Work Better and Longer." (1996).

*Primary Examiner*—George Yeung
*Attorney, Agent, or Firm*—Vogt & O'Donnell

[57] ABSTRACT

Fluid substances, particularly substances having differing viscosities, are combined and mixed by first segmenting a flow of a first fluid material to form a flowing segmented substance matrix containing a network of voids, such as by passing the flow through a plate having a plurality of passages therethrough and a second fluid substance is discharged into the segmented flow at a position which is substantially centrally disposed with respect to a cross-section of the segmented flow to combine the substance and additive, and then, the combined flow is mixed. The combined flow may be compressed and then mixed or may be compressed and then expanded prior to mixing. Additionally, a flow of a substance from a source such as an extruder may be partitioned into a plurality of streams and then, at least one of the streams is treated as specified above.

31 Claims, 5 Drawing Sheets

PROCESS FOR MIXING FLUID MATERIALS

CROSS REFERENCE TO RELATED APPLICATION

This application is a divisional application of application Ser. No. 08/188,437 which was filed Jan. 28, 1994, now U.S. Pat. No. 5,486,049.

BACKGROUND OF THE INVENTION

The present invention relates to combining and mixing substances in fluid form, particularly substances which have differing viscosities and particularly when one substance is an extrudate, particularly a food composition extrudate. The present invention also relates to partitioning a flow of a substance into a plurality of flows and treating the partitioned flows to obtain a plurality of products having differing characteristics, particularly when the substance partitioned has been processed by extrusion techniques and particularly when that substance is an extruded food composition.

As is known, obtaining a substantially homogeneous mixture of substances having differing viscosities is problematic. In particular, the dynamics of the differing viscosities of the substances make it difficult, without intensive mixing, to obtain a uniform distribution of a lower viscosity substance, such as additive substances added in relatively small amounts on the order of, for example, less than about 5%, or even less than 1% by weight, in a higher viscosity substance, since the lower viscosity substance inherently tends to resist combining with the higher viscosity substance. Moreover, intensive mixing is not desirable in many cases, particularly when the higher viscosity substance processed is sensitive to and adversely affected physically, or even compositionally, by effects of mechanical shear. Particularly affected are substances which have been processed by extrusion techniques, such substances including, but not limited to, extrusion-cooked food compositions, for example.

As is known, static mixers, including such as disclosed and referred to in King, U.S. Pat. No. 4,208,136, long have been employed to minimize temperature differentials of a fluid stream and for mixing various products. However, as King subsequently took note, as disclosed in each of King, U.S. Pat. Nos. 4,616,937 and 4,753,535, particular difficulties are experienced when seeking to mix substances of "widely disparate viscosities and/or very different flow rates", because the low viscosity substance tends to "tunnel" through the mixing elements without blending "to any great extent" with the high viscosity substance.

To address the problem, the King '535 patent discloses an apparatus having an outer conduit and an inner conduit, wherein a portion of a flow of a high viscosity substance is converged in a first portion of the inner conduit and passed to a second portion which contains static mixing elements and a port for introducing a lower viscosity substance, the objective being to effect a preliminary mixing of the additive and a portion of the high viscosity substance. The remainder of the high viscosity substance, which passes outside of the inner conduit, and the preliminary mix, which passes from the inner conduit, are directed downstream to a further static mixing device. As also disclosed, the further downstream static mixing device preferably is preceded by a conically shaped element having its apex directed at and substantially aligned with the longitudinal axis of the inner conduit to increase the effective surface area of the premix stream for the downstream static mixing of the preliminary mix and remainder of the high viscosity substance.

On the other hand, the King '937 patent discloses an encased "quill" which is positioned upstream of static mixing devices and which has a discharge port for introducing a low viscosity composition substantially at a centrally disposed position within a tubular conduit through which a higher viscosity composition flows. It further is disclosed that this apparatus preferably has a conically shaped protrusion which precedes the mixing devices and which has its apex directed towards the low viscosity composition discharge port to guide the fluids into a plurality of mixing device ports.

A further known low viscosity additive addition and mixing system, which is manufactured by Komax Systems, Inc., identified as the assignee of the afore-noted King patents, incorporates a device designated as the SIDD injection device. This device is sized to be positioned in a conduit and combined with static mixing disc modules positioned downstream of the device. The injection device includes a plate having a plurality of apertures uniformly sized and uniformly distributed to surround a centrally disposed and protruding cone, wherein each aperture is coincident with the opening of an adjacent downstream static mixing module. The SIDD device is designed to be positioned in a substance flow conduit so that the apex of the cone faces toward the primary high viscosity substance flow and ejects the additives against the flow of the high viscosity substance, the additives being caused by the substance flow to disperse along the outer surface of the cone and pass through the apertured portions of the plate adjacent the cone into the adjacent mixing module.

As the art also reflects, extrusion of plasticizable, or fluidizable, substances long has been practiced with product-exit die devices which are integral with a product discharge end of an extruder means which delivers an extrudate stream to the die devices. Thus, when it is desired to obtain extruded products of differing compositional character, such as may be brought about by, for example, addition of compounds and/or compositions which provide colorant, aromatization, flavorant and/or texturization properties, unless there are a plurality of dedicated extruder lines which employ differing ingredient mixes, an ingredient mix changeover is required. The first case, as will be appreciated, is equipment intensive, and the second is production capacity limiting.

An approach has been suggested in Canadian Patent No. 1 230 005 for producing a co-extruded food product having portions which differ in color, aroma, flavor and/or texture by employing an extrusion device which includes a first conventional screw extruder region, a second region which is partitioned to provide conduits in which extrudate passing from the first region is separated into a plurality of fluxes, i.e., flow streams, and a third convergence region to combine the separate fluxes for forming a composite product. Ports are associated with each separate conduit so that differing additives may be introduced into the separated fluxes to alter such as the color, aromatization and/or texture of the substance of the separate fluxes, and it is disclosed that static mixers may be incorporated into the conduits for effecting mixing of the additives and extrudate prior to recombination of the separated streams in the third region.

Efforts also have been undertaken in the art to split, or partition, the flow of extrudate emanating from an outlet end of a single extruder to facilitate forming an extrudate into a product or to manipulate the extrudate to produce products having differing character. Illustrative of such concepts are, for example, Kamp, U.S. Pat. No. 4,540,537, which discloses a channeled die assembly having a plurality of conduits which terminate in profiled dies for construction of particular plastic closure devices, and Heck, U.S. Pat. No. 4,772,197, which discloses an extrusion die assembly which is particularly useful for producing a plurality of food product strips.

Farnsworth, et al., U.S. Pat. No. 5,110,276, discloses a free-standing extrusion assembly wherein an extrudate from a discharge end of an extruder is partitioned and a plurality of conduits direct the extrudate to die units which enable differing physical manipulation of the product as the product exits the dies of the die units. This arrangement enables production of products which differ such as in shape and provides for, if desired, further extrudate stream partitioning and/or co-extrusion of extrudate streams. Thus, a plurality of products which differ such as in shape and/or composition may be obtained from each die unit. As also disclosed, additives, such as colorants and/or flavorants, may be introduced into one or more of the extrudate flow conduits, after which, each extrudate/additive flow is subjected to mixing, such as with a static mixer, prior to being directed to the die unit.

However, even in view of the afore noted disclosures, obtaining a substantially homogeneous mixture of substances having differing viscosities without intensive mixing, and without significant in-line pressure loss in the case of static mixing, is still problematical, particularly when the viscosities are significantly disparate and particularly in the case of incorporating additives into certain extrudate products which have been heat-processed, such as is the case, for example, with extrusion-cooking in the food art. Moreover, various additives desired to be incorporated into food extrudates, such as flavorants and aromatics, in particular, are sensitive to heat degradation, and thus, means for effective incorporation of such additives into extrusion-cooked products, other than before or during the extrusion working and cooking, long has been needed and sought to avoid or minimize additive degradation.

SUMMARY OF THE INVENTION

The present invention addresses problems noted above by providing processes and apparati for treating two materials in fluid form, be they compounds or compositions, to obtain a substantially homogeneous mix, and the present invention is particularly useful for combining and mixing two fluid substances having substantially differing viscosities. Practice of the invention enables reduction of the intensity of mixing which would be required if one were to employ process operations and apparati heretofore known in the art and hence, provides a reduction of shear stress effected upon the substances mixed.

The present invention thus also addresses, in particular, problems associated with combining and mixing substances wherein at least one of the substances is sensitive to mechanical shear, particularly shear-sensitive substances prepared or otherwise treated by extrusion processes including, but not limited to, food product compositions including, in particular, extrusion-cooked food compositions.

In addition, the present invention provides for simultaneous in-line preparation of a plurality of products which differ in character by partitioning a substance flow and then treating the partitioned flows differently to obtain products having differing character, the differences including, but not limited to, physical and/or compositional differences, including differences of shape, color, density and texture and also, particularly, in the case of food products, flavor and/or aromatization.

Accordingly, the present invention provides a process characterized in that a flow of a first fluid substance under pressure is segmented to form a flowing segmented substance matrix containing a network of voids, i.e., substance portions having gaps therebetween, and in that a flow of a second fluid substance is discharged into the segmented substance flow at a position of a portion of the segmented substance flow which is substantially centrally disposed with respect to a cross-section of the segmented flow for introducing the second substance into the segmented substance flow to obtain a combined substance and additive flow, and then the combined flow is mixed.

In accordance with the invention, the viscosities of the first and second substances differ, and the second substance (hereinafter, solely the "additive") has a lower viscosity than the first substance (hereinafter, solely the "substance"). As also used herein a substance or additive flow means a flow which is confined within a boundary, such as by a conduit, and a cross-section of a flow is a section which is perpendicular to a longitudinal axis of the flow, i.e., perpendicular to the linear direction of flow in such as a conduit.

As will be found in practice of the described process, the additive discharged into the substance flow eddies with respect to the matrix of the segmented flow of the substance and percolates in the voids of the void network to disperse in the substance flow, which facilitates obtaining a substantially homogeneous mixture.

In-line mixing of the combined substances and additive is effected most advantageously by static, i.e., motionless, mixing, although practice of the invention as defined above is not intended to be restricted to such.

Further included in the present invention is a process characterized in that a flow of a fluid substance is partitioned into a plurality of flow streams, and at least one additive is introduced into at least one partitioned flow stream and mixed in accordance with the process described immediately above, and then, each partitioned stream, whether containing additive or not, may be collected separately or further processed separately, or a plurality of streams may be combined and then collected or further processed. As will be appreciated from the context of this disclosure, introducing differing additives into separate substance streams provides for obtaining products which differ in composition.

Preferably, the process of the present invention is characterized further in that, subsequent to additive introduction into a segmented flow of a substance and prior to mixing, i.e., downstream of additive introduction and upstream of mixing, the combined substance/additive flow is compressed to a reduced cross-sectional flow area, this embodiment being essential when processing substances which, upon being extruded through a die, i.e., a forming orifice, do not "set" or tend to "set" and thus form what is known commonly in the extrusion art as "ropes". That is, substances which set, or tend to set, tend to, after exit from the die, maintain the form shaped by the die and have a resistance to recombining into a homogeneous mass. Examples include thermosettable polymer plastic resin-based materials which set when subjected to heat and include food product substances which contain proteins and/or starch which gel, particularly when subjected to heat.

Hence, in the context of the present invention, substances which are deemed to set or to tend to set are meant to be those which tend to retain a discrete shape and identity after being extruded through a die. In the context of the present invention, such substances upon passage through the apertures of the segmentation means will provide a plurality of portions each of which tend to retain a discrete identity and resist, without extraneous force, recombining into a homogeneous mass.

In the case of substances which set or tend to set, it has been discovered that the plurality of portions which form the segmented matrix tend to confine the additive within the matrix more effectively than is the case with substances which do not set or tend to set. In the latter case, the segmented matrix and void network formed tend to lose their identities as the flow proceeds downstream of the segmentation means, and that reduces the ability of the segmented substance to confine the additive within the substance because of the inherent proclivity of the additive to escape from the substance flow. The compression, however, combats the loss of confinement-ability of the substance and counteracts the inherent proclivity of the additive to escape from the substance flow.

In any event, however, in either case noted above, when a substance and additive(s) are combined in accordance with the segmentation/additive introduction feature of the invention, but are not compressed, the intensity of mixing required to achieve a substantially homogeneous mixture is greater than if one proceeds with the compression step.

Preferably, after compression, the compressed substance/additive flow is allowed to expand in cross-sectional area and then, the expanded flow is subjected to mixing. The expansion is advantageous not only for generally enhancing additive distribution but also, generally, in the context of unit-processing, it is of assistance to modulate in-line processing pressure differentials effected by, for example, the compression.

Also included in the present invention are apparati which advantageously may be employed for practice of the processes described above. The apparati are characterized in that they include means for flow segmentation of a fluid substance for forming a substance matrix containing a network of voids in the flowing substance and means for discharging a fluid additive at a position substantially coincident with a centrally disposed portion of the segmenting means for introducing the additive into the segmented substance to combine the additive and segmented substance. In particular, such apparati include an apertured plate, i.e., the segmentation plate, and means for directing the additive to the discharging means at a position substantially coincident with a centrally disposed portion of the plate.

The segmentation plate of the invention has opposing faces, which define a plate thickness therebetween, and a plurality of apertures extend through the thickness of the plate, from face to face, to provide passages through the plate for segmenting a substance flow directed towards the plate face facing the flow, i.e., the upstream face.

As will be appreciated, in accordance with employing a plate to segment a flow of substance, such is sized and configured and has a strength sufficient so that when integrated in-line with a conduit suitable for transporting the substance flow, particularly a flow under pressure, the plate is suitable for segmenting the substance flow while maintaining its structural integrity.

Although the additive discharge means may be provided by a pipe distinct from the plate and positioned adjacent a plate face, preferably, the means for discharging the additive flow for introducing it into the segmented substance is a bore arrangement formed within the plate which extends internally in the plate between the plate faces to a plate face opening which is substantially centrally disposed with respect to the plate faces.

Further included with the foregoing apparati of the present invention are mixing means, preferably static, i.e., motionless, mixing means, positioned in a downstream flow relation to the segmenting and discharging means for receiving the flow.

Further embodiments of the present invention include means positioned for receiving and for compressing the substance/additive flow downstream of the flow segmentation and additive addition means, and such may be embodied simply by means for constricting the flow into a reduced cross-sectional flow area, such as, preferably, through a venturi-shaped conduit portion.

In a compression/expansion embodiment, means are provided downstream of the compression means for expanding the compressed flow, and such simply may be a conduit portion having a larger cross-sectional internal flow area than the smallest cross-sectional internal flow area of a compression conduit.

Additionally included in the present invention are means for partitioning the substance into a plurality of streams and conduits for containing the separate streams and wherein at least one conduit includes the segmenting and discharge means. This embodiment enables, in particular in the case of processing an extrudate, not only obtaining products having differing character, but also downstream arrangement of dies in a compact unitary plate from which separate streams of substance and/or substance/additive(s) are discharged. One such partitioning embodiment of the present invention includes a means for assisting the cleaning of the apparatus systems, and a second embodiment includes a valved plate arrangement which avoids a necessity of "cleaning", such as is required with known ball, or globe, valve arrangements.

DETAILED DESCRIPTION OF THE INVENTION

In seeking to solve problems associated with obtaining a homogeneous product when mixing flows of a substance and additive having differing viscosities, including those noted in the discussion of the art above, it was discovered that operating in accordance with the segmentation and additive addition concept of the present invention provides for counteracting the inherent tendency of an additive to migrate to and accumulate excessively at the outer surface of the entirety of the flow of a more viscous substance, i.e., at a position between the substance and an interior wall of a conduit in which the flow is contained. In this regard, it has been found that the surfaces formed in the segmented flow of the higher viscosity substance present and define a matrix about a network of voids in which, even if extant only for a brief period of time, the lower viscosity additive eddies and percolates. The inherent resistance of the less viscous additive to combine with the flowing higher viscosity substance, and hence, the tendency of the additive to separate from the substance flow, is counteracted by dispersion of the additive among a plurality of portions of the flowing substance which tend to confine and trap the additive.

In addition, the segmentation means plays not only a role of forming and defining the configuration of the plurality of void areas of the void network in which the additive flows to fill, but also plays a further role in the distribution of the lower viscosity additive. That is, it has been found that the solid portions of the downstream plate face about the plate face apertures provide a protective barrier on which a portion of the lower viscosity additive "runs" or "shadows", those portions thereby acting to distribute a portion of the lower viscosity additive to voids formed in outer cross-sectional regions of the flowing segmented higher viscosity substance. Hence, the segmentation means and additive discharge means provide for dispersing the lower viscosity additive into a matrix formed by the higher viscosity substance prior to mixing, which tends to resist the proclivity of a lower viscosity additive to separate from a higher viscosity substance.

It has been discovered, therefore, that the problems caused by the mixing behaviors of materials having differing viscosities can be addressed by formation of the substance matrix and void network in which the lower viscosity additive is distributed, concentrated and more or less confined by the higher viscosity substance matrix to provide a type of "premix", which thereby enables obtaining a substantially homogeneous mixture by mixing with less intensity than has been known previously to be required to achieve substantial homogeneity.

As will be appreciated, upon practice of the present invention, consideration of the viscosities of the materials to be processed are to be taken into account. Substance and additive combinations having substance to additive viscosity ratios of on the order of up to about 750,000:1 and, in particular, on the order of from about 100,000:1 to about 500,000:1 are processed advantageously in accordance with the invention. Generally, for example, as the difference between the viscosities lessens, the tendency of the additives to migrate from the substance, which the various embodiments of the invention counteract, will lessen.

The substances processed in accordance with the invention may be any of various compounds and compositions which are a fluid, other than a gas, or which may be fluidized to provide a fluid, i.e., flowable, form and may have viscosities up to at least about 1,000,000 cP, and particularly, on the order of from about 100,000 cP to about 750,000 cP, and more particularly on the order of from about 200,000 cP to about 500,000 cP. Such substances also include, as will be appreciated, a variety of plasticizable substances, i.e., substances which are malleable and capable of being formed, deformed and shaped, particularly under the effects of heat and/or pressure, which may be processed in a fluid or fluidized form, including extrudate material.

Substances which may be processed usefully in accordance with the invention include, for example, chemical polymer and co-polymer resin-based materials including polyolefins and other plastic resin-based materials including, but not limited to, polyethylenes, polypropylenes, polyvinylchloride, polyamides, acrylonitriles, polyesters, polycarbonates and the like.

As noted above, however, the present invention includes processes and apparati which are particularly advantageous for processing food product compositions which tend to set upon being processed with heat and pressure, such as by extrusion-cooking, and which are affected adversely by the effects which result from mechanical shear, such as from mixing operations. Such food products include human and animal food products and food product bases, including, but not limited to, amylaceous/farinaceous products and fiber products and starch- and protein-based products including such as cereal products from which doughs and dough-like substances are made and including vegetable- and fruit-based products. Such products include, but are not intended to be limited to, for example, ready-to-eat breakfast cereals, cereal- and/or vegetable- and/or fruit-based snack food products, texturized vegetable protein products, pastas, and cereal- and/or protein-based pet foods, whether or not produced by extrusion-cooking.

Food composition extrudate substances most advantageously processed in accordance with the present invention generally will have a moisture content which contributes to the product being sensitive to mechanical shear force. In general, extrusion-cooked food substances which have a moisture content on the order of from about 5% to about 50% by weight, will exhibit that characteristic. Extrusion-cooked food substances which may be processed very beneficially in accordance with the invention may have a moisture content of less than about 35% by weight, including such as from about 15% to 30% by weight, and as will appreciated by one skilled in the art, such substances, when extrusion-cooked, readily set after being formed into a shape, upon such as being passed through a die, i.e., orifice, and are sensitive to effects of shear forces.

Any of a variety of compounds and compositions may be employed as the additive, the criterion being that such be embodied in a fluid form. Such include liquids and gases, and solid particulate substances also are not precluded, such preferably being carried by a liquid carrier, such as by dispersion or suspension in a liquid carrier.

In general, viscosities of the additives may range from less than about 1 cP to about 1,000 cP, and as will be appreciated, all additives in food applications should be food-acceptable. Typically desirable additives include colorant compounds and compositions, as are well-known in the art, such as pigments and dyes. Particularly in the case of food compositions, the additives may include compounds and compositions which provide for adjusting texture and/or density of the products and for flavoring and/or aromatizing foods. As is known to those skilled in the food art, such additives include, without limitation, such as lipids and glycerides including fats and oils and fatty acids, fat-substitutes, gums, including guar and xanthan gums, food-acceptable gases and Maillard reaction products and other flavorant and aromatization compounds and compositions and precursors.

Further, in this regard, as is generally accepted in the food extrusion art, when amylaceous/farinaceous and/or proteinaceous products are extruded, lipids typically may constitute up to only about 5% to 6% by weight of the product, since the lipids act as an extrusion lubricant. At higher levels, the lipids tend to affect the extrusion processing adversely which, for practical purposes, thus limits the amount of lipid that can be employed. Moreover, incorporation of further lipid into an already extruded product is problematic, and thus, lipid addition generally requires enrobing the product.

In the present invention, however, it has been discovered that additional lipids may be incorporated into the substance readily as an additive to achieve final products having lipids in an amount in excess of from about 5% to 6%, such as up to about 20%, which are substantially homogeneously distributed in the product. Hence, the present invention enables one not only to adjust final product lipid content readily but to contain it within a product matrix.

The amounts of additives employed and a rate of additive addition are those sufficient to provide, for example, a final product with a desired color, texture, density, aroma and/or flavor, the amounts added being in accord with amounts employed in the art to achieve a desired effect. Such may be obtained in the case of water-soluble additives, for example, by forming an aqueous solution or dispersion having a solids concentration on the order of from, for example, about 1% to about 10%, or more, by weight. Further, desired amounts of additive addition, including any carrier, may be controlled readily by monitoring flow rates of the additive and substance processed with such as flow meters, as is known in the art. In addition, as will be appreciated, should one be processing a heated substance, such as an extrusion-cooked extrudate, for example, heating of an aqueous additive solution prior to introduction into the substance may be useful to minimize thermal shock, but such need not be heated to the temperature of the substance.

As indicated above, the segmentation means is most conveniently embodied by an apertured plate and the apertures are most effectively dispersed in a substantially balanced manner through the plate and across the plate faces. The plate may be made of various materials, the selection of which, as will be appreciated, should be made particularly with regard to the strength required for structural integrity, that being dependent particularly upon the nature of the substance being processed and the conditions of any upstream in-line processing including, particularly in the case of extrusion processing, pressure.

For example, when extrusion-cooked food products are processed, pressures on the order of up to 200 to 300 bar may be generated, and in the case of extruded polymer plastics, pressures on the order of up to, and in excess of, 1000 bar may be generated. Thus, the segmentation plate material strength, which is deemed to include consideration of the plate thickness, should be considered accordingly and should be sufficient to withstand such pressures without breaking. However, particularly in the case of products sensitive to mechanical shear, it is desired to employ a minimal plate thickness, since passage of substance through the apertures of the plate will effect shear stress.

Generally, a segmentation plate made of tempered steel is sufficient for most processing applications. However, should the substance being processed have a substantial acid character, the plate, and of course all other apparati, should be resistant to acidic corrosion. For example, one may desire to employ ceramic substances, such as zirconium, for example, to coat a steel plate.

The apertures of the segmentation plate are formed, while keeping structural integrity in mind, to obtain an open area through the plate preferably on the order of from about 20% to 50% of active substance contact face area, the active substance contact face area being that area provided for contact with the substance, such being equivalent with the cross-sectional area of the flow of the substance prior to segmentation. Each aperture preferably provides an open area of up to about 5% of the total open area and generally, on the order of from about 1% to about 5% of the total open area. Preferably, it is desired to provide a maximum of open area through the plate, which will be found to range, practically, on the order of from about 40% to about 50% of total active substance contact face area. The configuration and shaping and sizing of the apertures holes may be irregular and are exemplified further in connection with the discussion of the drawing Figures below.

In general, for materials such as tempered stainless steel, and for pressures on the order of about 250 bar, such as may be generated by extrusion-cooking, a plate face-to-face thickness on the order of from about 6 mm to about 20 mm is sufficient when the plate has an aperture open face area on the order of from about 40% to about 45% and when the individual apertures vary in size and range in open area on the order of from about 1% to about 5% of the total open area.

Additive delivery may be effected by employment of a pumping means which generates sufficient pressure to deliver and discharge the additive fluid into a segmented flow of the more viscous substance from the additive delivery and introduction means. Under conditions of substantial pressure, a positive displacement piston pump and like pumps capable of generating pressure in excess of that in the conduit line into which the additive is introduced, such as are obtainable from manufacturers such as Brann & Leubbe and Luwa, should be found to be suitable for effecting delivery of the additive for discharge into the segmented flow of the higher viscosity substance at a position and a point in time substantially coincident with the formation of the matrix/void network substance flow.

As indicated above, the additive delivery and introduction means preferably is embodied by a bore arrangement formed within the segmentation plate. In one embodiment, the bore may extend internally from such as an edge of the plate through the plate perpendicular to a central axis of the plate extending between the faces and open into an aperture which passes face to face through the plate and which is substantially centrally disposed with respect to the surfaces of the plate faces. As will be appreciated, this embodiment also will allow substance to pass through the aperture.

More preferably, a centrally disposed portion of one plate face forms a solid surface and the other plate face contains an additive introduction opening which communicates with the internal bore. The bore may be formed in two discrete portions, the cross-sectional size of each portion preferably being substantially the same. Thus, the two bore portions may be arranged perpendicularly, wherein the first bore portion extends from such as an edge of the plate through the plate perpendicular to the central axis of the plate faces to the second bore portion, which may extend parallel to the central axis and lead to the opening, or the second bore portion may be arranged angularly with respect to the central axis of the plate faces and the first bore portion and lead to the opening.

As will be appreciated sizing of the bore and plate face discharge opening may be made relative to the amount of additive desired to be introduced and to flow rate and the character of the additive. Generally, a cross-sectional bore/opening area sufficient is on the order of up to about 1% of active substance contact face area, such as from about 0.1% to about 1%, although larger cross-sections are not intended to be precluded such as within a range of up to about 2% to about 3% of total active face substance contact area or more.

Selection of a mixer also, as will be appreciated, should be made with reference to the viscosity primarily of the substance being processed, upon the amount of mixing desired and the amount of pressure drop caused by the mixer, the latter being sought to be minimized. Although any of various mixers may be employed, including in-line dynamic mixers, in-line static mixers are preferred since one should be able to realize lesser shear stress with static mixing than would be the case with dynamic mixing.

When static mixers, for example, are employed, such should be selected for effecting objectives of maximal open area for flow and of minimal length to minimize pressure drop, while achieving a desired degree of mixing, and as the open area increases and the length decreases, shear stress caused by mixing is reduced. As will be appreciated, for the viscosity ranges specified above, it is preferable the mixers be suitable for mixing high viscosity fluids having laminar flows, such mixers preferably having multi-layers to split and recombine the substance/additive flow, such mixers, as are known in the art, including those such as the Koch mixers described in CHEMICAL ENGINEERING PROGRESS, June 1991 pp. 32–38, and the like.

In addition to the compression embodiment being essential for processing substances which are not prone to setting by reason of such as heat-processing and/or otherwise do not tend to set during processing, such however may be employed advantageously with any substance since, as the disparity in substance/additive viscosity ratio increases, employment of compression assists in improving homogeneity. Thus, compression also is employed advantageously when the substance/additive viscosity ratio is in excess of 100,000:1 and particularly when in excess of 250,000:1.

In the practice of the compression and compression/expansion embodiments, the linear flow under pressure is compressed most advantageously to a cross-sectional area which is on the order of from about 40% to about 80% of the cross-sectional area of the linear flow prior to compression. For expansion, although not required, it generally is most advantageous to expand the compressed flow to a cross-sectional area which is about as large as the cross-sectional area of the flow prior to compression and generally. However, expansion to a cross-sectional area which is at least as large as that of the flow prior to compression is preferred and such may range up to about twice as large or more.

As indicated above, the compressing means may be formed simply by such as an inclined constricting conduit wall formed preferably as a venturi. As will be appreciated, such may be frustoconical in shape when the conduit has a circular cross-section or may be otherwise curved or shaped. The expansion means likewise may be constructed as a venturi.

In practice of any of the process and apparatus embodiments of the present invention in association with extruded substance, any of a variety of extruders, including screw extruders, may be employed, the primary criterion being that such generate sufficient pressure to urge the flow of extrudate from the discharge end of the extruder through a plurality of partitioned streams and associated extrudate product discharge dies. Such extruders may include, for example, single and twin screw extruders obtainable from manufacturers including Werner & Pfleiderer, Wenger, Sano, Leistritz, Er-We-Pa, Clextral and Buhler, and for amylaceous/farinaceous and proteinaceous products, twin screw extruders are preferred.

In partitioned embodiments, most advantageously, the partitioning assembly and the other associated apparati of the present invention are integrated with one another and with, advantageously, an extrusion device means, in a detachable manner, and generally, as will be appreciated, such may be positioned and carried readily on a suitable frame means.

In the context of the partitioning embodiments of the present invention, and particularly in the context of processing an extruded substance, any of various split stream and multi-die unit configurations and assemblies may be integrated with the discharge end of an extruder so that extrudate flowing from the extruder is partitioned into at least two separate streams. Such apparati may include that described in Farnsworth, et al., U.S. Pat. No. 5,120,554, the disclosure thereof being incorporated herein by reference as if fully set forth. However, it has been found that the partitioning distribution means disclosed herein each enable dispensing with the Farnsworth manifold piping arrangements and with the valves which are employed to control extrudate stream flow and to equalize the pressure of the plurality of streams.

In a preferred embodiment associated with the partitioning means, an adapter means is integrated with an extruder discharge end in lieu of a conventional extruder die discharge assembly and is configured to converge the flow of extrudate from the extruder to obtain a flow vector which is substantially uniform and linear. That is, the adapter is constructed to affect the flow so that tendencies of lateral flow, due to such as the effects of screw rotation, are muted, or at least minimized.

In one substance distribution partitioning means embodiment, a plate and valve means is employed to partition a substance flow into a plurality of streams, to provide for interruption of the flow of any one of the plurality of streams and to achieve a self-cleaning effect by reason of the arrangement of passages and valves. In this embodiment, a plate having two opposing faces is provided wherein a recess, or cavity, is formed in the plate and extends from one plate face into the plate and is preferably substantially centrally disposed with respect to the edges of the plate face. That is, the plate contains an opening which passes only partially through the plate thereby forming a recess. Emanating from the recess are a first set of a plurality of bores which provide passages which extend from the recess at an angle, with respect to central axis of the recess, through the plate to provide openings on the other plate face. As will be appreciated, the openings of the passages have a cross-sectional area smaller than that of the recess.

Associated with the first set of bores in a one-to-one relationship is a second set of bores which extend between the plate faces through the plate in a direction transverse to, and preferably substantially perpendicular to, the central axis of the plate faces and the recess, to communicate with the first set bores. Valves are positioned in the second set bores, and each second set bore and associated valve is positioned and configured and has a size sufficient to enable closing the associated first set bore to block substance flow therethrough.

Additionally, as will be appreciated, in operation, when the substance flow of one passage is interrupted, it may be desirable to interrupt the flow of one or more other passages to balance the overall flow vector.

Alternatively, in a second partitioning embodiment, a distribution plate and cleaning valve arrangement is provided, the valve arrangement being described in more detail in Farnsworth and Johnson, application Ser. No. 08/188,950, entitled "Fluid Flow Valve Device And Assemblies Containing It", filed concurrently with the parent application, Ser. No. 08/188,437, of this application and now U.S. Pat. No. 5,443,092 herewith, and which is incorporated herein by reference as if fully set forth.

In summary, the second embodiment distribution means also has a plate having two opposing faces. The plate of this embodiment is provided with a protrusion, which may be shaped such as a protruding cone, which extends from and which is a substantially centrally disposed with respect to one plate face, the apex of the protrusion being directed at a position so that it will be substantially centrally disposed with respect to a flow of a substance. A set of a plurality of bores which provide passages through the distribution plate from one face to the other is positioned about the base of the protrusion for passing the extrudate through the plate in a plurality of partitioned streams.

In the second distribution embodiment, to facilitate cleaning of the apparatus system, a portion of the protrusion which includes the apex of the protrusion is arranged integrally with a valve device which provides for displacing and separating the apex portion of the protrusion from the remainder of the protrusion and for passage of a cleaning fluid such as water and/or steam. The protrusion/valve arrangement is constructed so that upon pressure being exerted against the outer surface of the protrusion, which is greater, than a pressure exerted on a valve piston, the protrusion is sealed, and so that when the valve piston is under a pressure in excess of that exerted against the outer surface of the protrusion, the separable portion of the protrusion is displaced from the remainder of the protrusion to pass the cleaning fluid from the valve.

In the case of the preparation of shaped extruded products, an assembly in accordance with the present invention also includes product outlet means by which, because of the structural compactness the invention permits, not only positioning of a plurality of dies in a single die plate, but also, a plurality of plates to be carried in a single plate retainer to treat a plurality of product streams. Thus, a die plate and its associated dies for each product stream become an insert in a combined die plate retainer at the the discharge end of an assembly of the invention and the retainer may contain such as up to six to eight, or even more, die plates. As also will be appreciated, therefore not only may the assembly employ a number of dies, but their associated cross-sectional shapes and area can be varied to achieve production of a plurality of differing product dimensions and shapes simultaneously.

Additionally, because of the compactness of the apparatus, a single cutter means may be employed for a plurality of product streams. Cutting of the extrudate exiting the dies may be effected, if desired, by any of various means known in the art, and may include such as a rotary cutter attached centrally to the die plate retainer. Alternatively, one may employ more than one independently operated cutter means positioned adjacent the die plates which are to cut product exiting the dies of differing die plates to obtain cut product having, for example, differing lengths.

Further in the context of the foregoing, the accompanying drawing Figures are presented to illustrate, by way of example only, embodiments of the present invention further.

BRIEF DESCRIPTION OF THE DRAWING FIGURES

DETAILED DESCRIPTION OF THE DRAWING FIGURES

Figure 1:
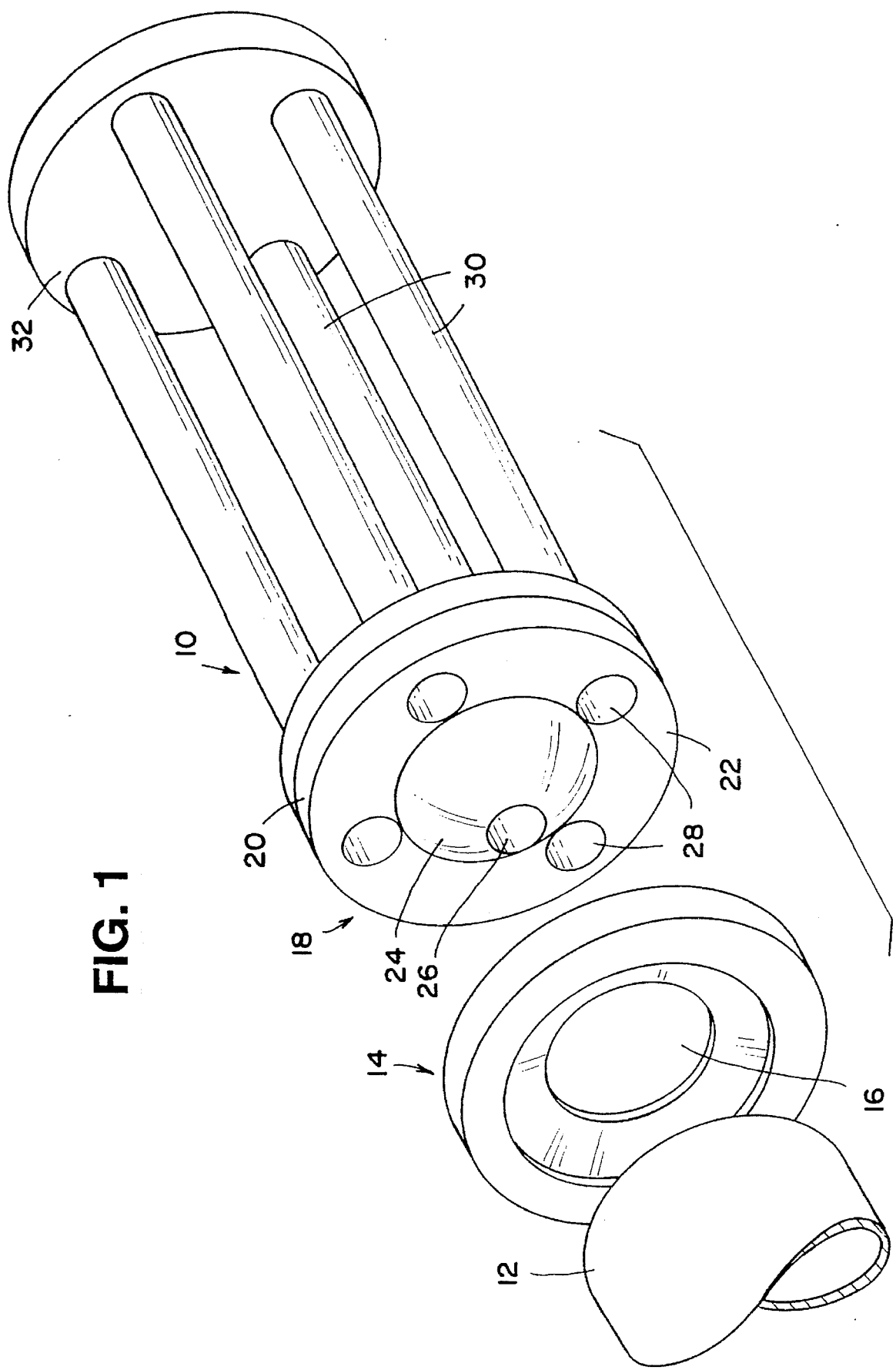
FIG. 1 illustrates a perspective view, partially exploded, of apparati arranged in accordance with the present invention.

An illustration of an apparati assembly in accordance with the present invention for partitioning a flow of substance, such as an extruded substance into a plurality of flow streams, and for combining additive(s) with at least one of the separate flow streams is presented in FIG. 1, wherein the apparati of the present invention and a partitioning means are designated generally by reference numeral 10.

Included in the depiction of FIG. 1 is a partial view of the barrel of an extruder 12. Extrudate flow convergence adapter means 14, for muting the extrudate lateral flow vector, is illustrated as having a sleeve portion in which the extruder barrel may be fitted and as having an interior portion beveled to constrict in cross-sectional size thereby forming venturi opening 16.

Also illustrated is a substance distribution partitioning means 18 which conforms with that referred to above as the second embodiment partitioning means. This partitioning means embodiment includes plate 20, having plate face 22 from which substantially cone-shaped protrusion 24, including displaceable portion 26, protrudes. Plate 20 is illustrated as providing four passages therethrough, each of which emanates from a separate opening 28 in plate face 22 positioned about and adjacent the base of protrusion 24.

Partitioning means 18 provides for partitioning a substance flow from extruder 12 via adapter 14 into a plurality of streams with passage of the substance about protrusion 24, which aids in directing the flowing substance to each of openings of plate passages 28. After passing into passages 28 and through plate 20, the flow streams pass through barrel conduit lines 30 in which means for substance segmenting, additive addition, compression, expansion and mixing, prior to product exit from each barrel line at retainer plate 32, are located.

As will be appreciated, either or both of adapter 14 and plate 20 may be sleeved to fit slidably together to provide suitable displacement of protrusion 24 with respect to the venturi bevel opening of adapter 14, and any of various fixing means, including bolting means through the plate faces or sleeve portions, may be employed to affix the members suitably. As will be appreciated also, the apparati of FIG. 1 may be mounted on frame members for support.

Figure 2:
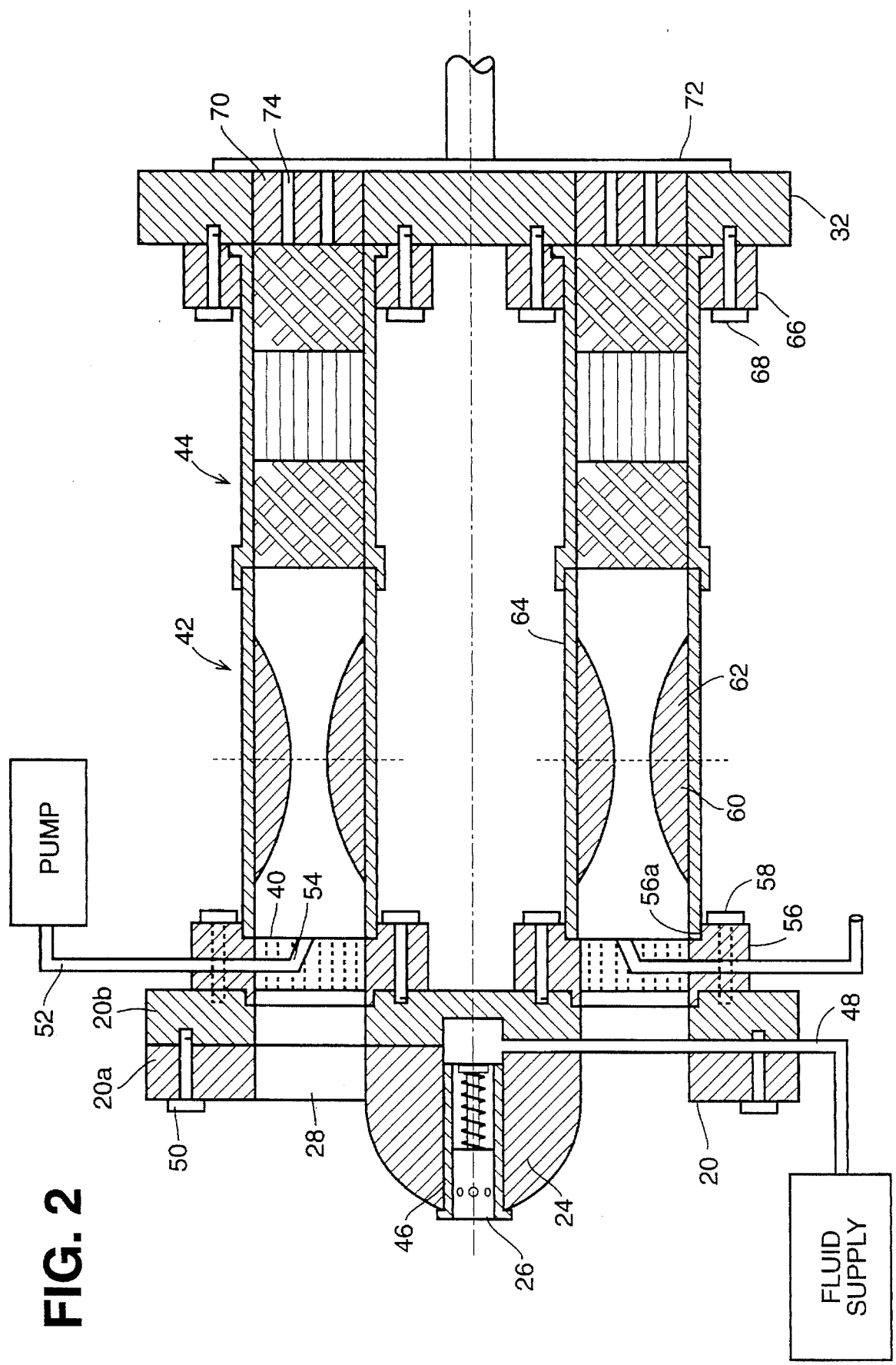
FIG. 2 illustrates a side elevation section view of apparati of the present invention.

FIG. 2 depicts a side view of the internal apparati members within barrel 30 of FIG. 1, which include a partitioning means 18, a segmenting means 40, which may take a form of an apertured plate, a compression and expansion means member 42, and a mixing means 44, such as static mixers. As illustrated, each of these members may be configured readily to provide sleeving arrangements and which may be integrated to form an appearance of barrels 30 as illustrated in FIG. 1.

Included in FIG. 2 is representation of a valve means 46 which is positioned within protrusion 24 and provides a displaceable protrusion portion 26, the valve being connected By a bore line 48 to a fluid supply such as a water supply, illustrated in block diagrammatic format. As also illustrated, plate 20 is formed of two plate portions 20a and 20b held together by fixing means such as bolts 50, but as will be appreciated, a single plate may be formed and machined to provide the illustrated structure.

Additive addition feed line 52, which is connected with segmentation means plate 40, is depicted with a pump designated in block diagrammatic format. Feed line 52 leads to segmentation plate bore 54 for additive discharge at a point in time substantially coincident with formation of the matrix/void network, i.e., subsequent to exit from plate 40. As illustrated, bore 54 has an arrangement wherein a first bore portion extends internally from an edge of the plate between the faces of the plate through the plate perpendicular to the central axis of the plate faces to a second bore portion arranged angularly with respect to the central axis of the plate faces and which leads to an opening substantially centrally disposed with respect to the plate faces. Substance segmentation is provided by the combination of solid portions of plate 40 and the aperture passages which the solid portions surround, passages being represented in FIG. 2 by dotted lines.

Also illustrated in FIG. 2 is a plate affixation portion 56 having a base for accommodating such as a bolt 58 for being affixed in a threaded bore in partitioning plate 20. The sleeve and affixation portion 56 has an interior sleeve portion 56a sized for fitting the peripheral barrel portion of member 42. Alternatively, the segmentation plates 40 may be configured to have a sleeve portion sandwiched between a unitary plate having apertures positioned to fit around the outer peripheral surfaces of a plurality of plates to hold them integrally with plate 20, the two plates being affixed by suitable means such as threaded bolts. Further alternatively, plate 20, may be machined to contain the segmentation plates within plate passages 28, and hence, an additive addition feed line would also be machined in plate 20.

As illustrated in FIG. 2, a compression portion of member 42 is designated by reference numeral 60. Although member 42 may terminate at a point indicated by the dashed line, which thereby would result in member 42 effecting solely compression of the substance and additive flow, member 42 may be configured, as illustrated by portion 62, to provide also for expansion. Thus, as illustrated, expansion portion 62 is shown as a flaring portion which extends from the venturi of the compression portion 60. Although such flaring, or beveling, is not essential to either portion, such modulates pressure differentials and facilitates in-line apparatus cleaning. Although compression portion 60 is shown as beginning downstream of the upstream end of member 42, such may be configured to be positioned immediately adjacent the downstream face of segmentation and additive introduction means plate 40, and likewise the termination of expansion portion 62 may be configured to be positioned immediately adjacent the upstream end of mixing means 44.

Mixing means 44, supplied preferably by static mixers, are arranged, as illustrated, in-line adjacent the expansion portion of member 42. As illustrated, the upstream portion of the mixer barrel has a sleeve portion 64 to engage member 42 and a mixer affixation portion 66 may be integrated with the downstream portion of the mixing means barrel and may be provided with such as a bore for accommodating a bolt 68 for being affixed the downstream mixer to retainer plate 32 which retains die plates 70. A cutter means includes knife 72 positioned adjacent retainer plate 32 to cut product which exits dies 74. Again, a further plate suitably affixed to retainer plate 32 may have apertures configured and fixing means to accommodate and secure the mixer barrels.

Figure 3:
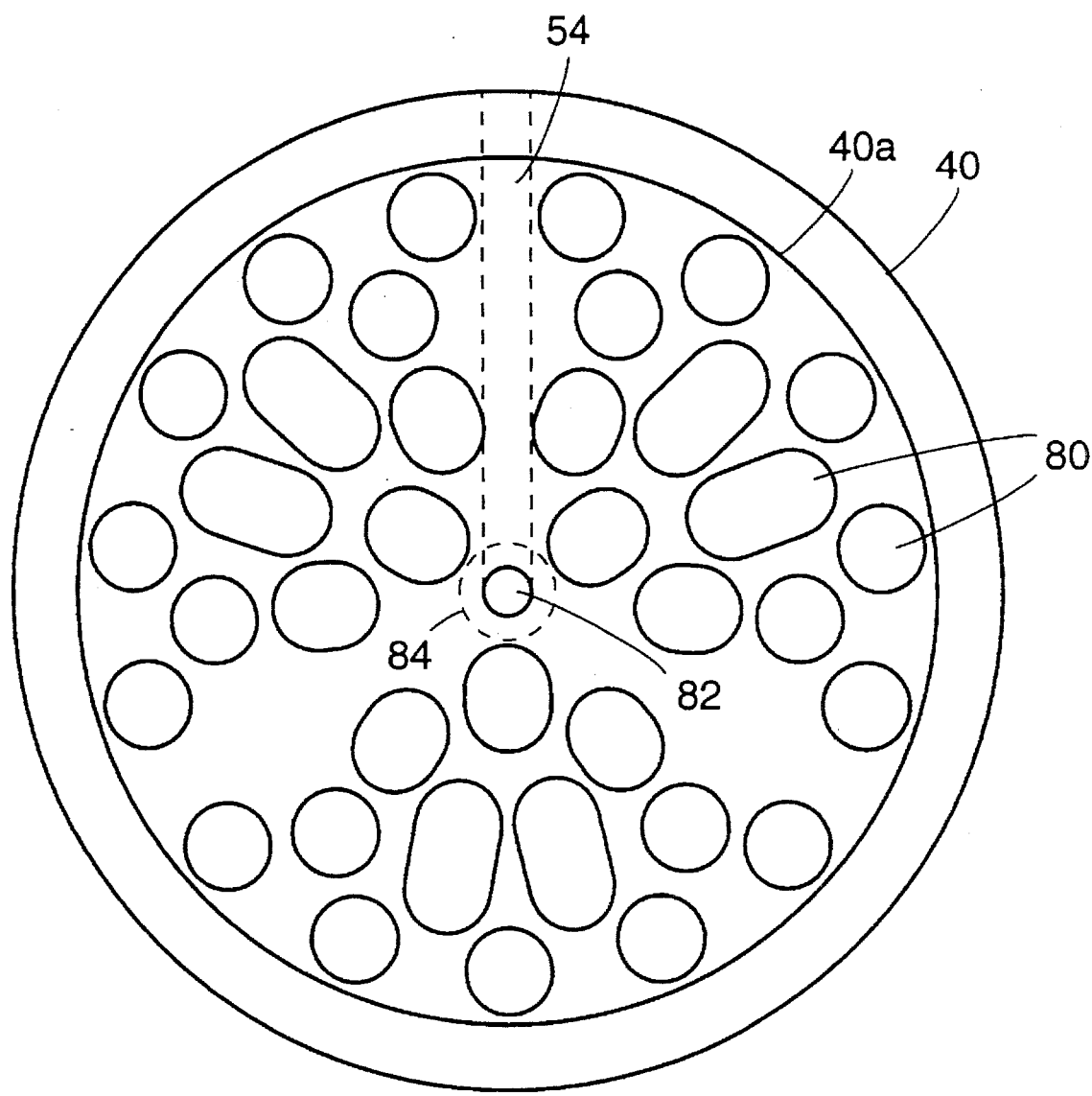
FIG. 3 illustrates a substance segmenting means according to the present invention.

FIG. 3 illustrates a configuration of an apertured segmenting plate 40 which has a face which presents a total substance contact area 40a which is fitted to conform with the inner surface of a fluid flow conduit to segment a substance flow. A plurality of apertures 80 are dispersed across the faces of the plate and pass through the plate to provide segmenting passages. To obtain maximal open area, the apertures may be spaced irregularly and vary in shape. In the preferred case, no aperture passes through the plate to intersect additive feed bore 54, indicated by the linearly extending dotted lines, and opening 82. However, as indicated above, an embodiment of the invention may include a centrally disposed aperture 84, as indicated in dotted-line format, through the entirety of the plate and in this case, substance will pass through and pull the additive with it to direct the additive from bore 54 in the plate interior into the segmented flow. Additionally, a pipe could be secured to the downstream plate face, positioned as indicated by the dotted lines for bore 54, to have an exit opening positioned at a substantially centrally disposed portion of the plate face.

As will be appreciated, when plate 40 is integrated into a conduit, substance flow towards it will impact the upstream plate face and be disrupted and segmented as it passes through the apertures, and the plate provides a total substance contact area which is substantially equivalent to the cross-section of the substance flow, i.e., as determined by a boundary of a conduit confining the flow. In addition, the apertures of plate 40 may be viewed as providing a general outline of the segmented material matrix, and the solid portion of the plate may be viewed as providing a general outline of the void network which is formed upon exit of the substance from the downstream face of the plate.

Figure 4:
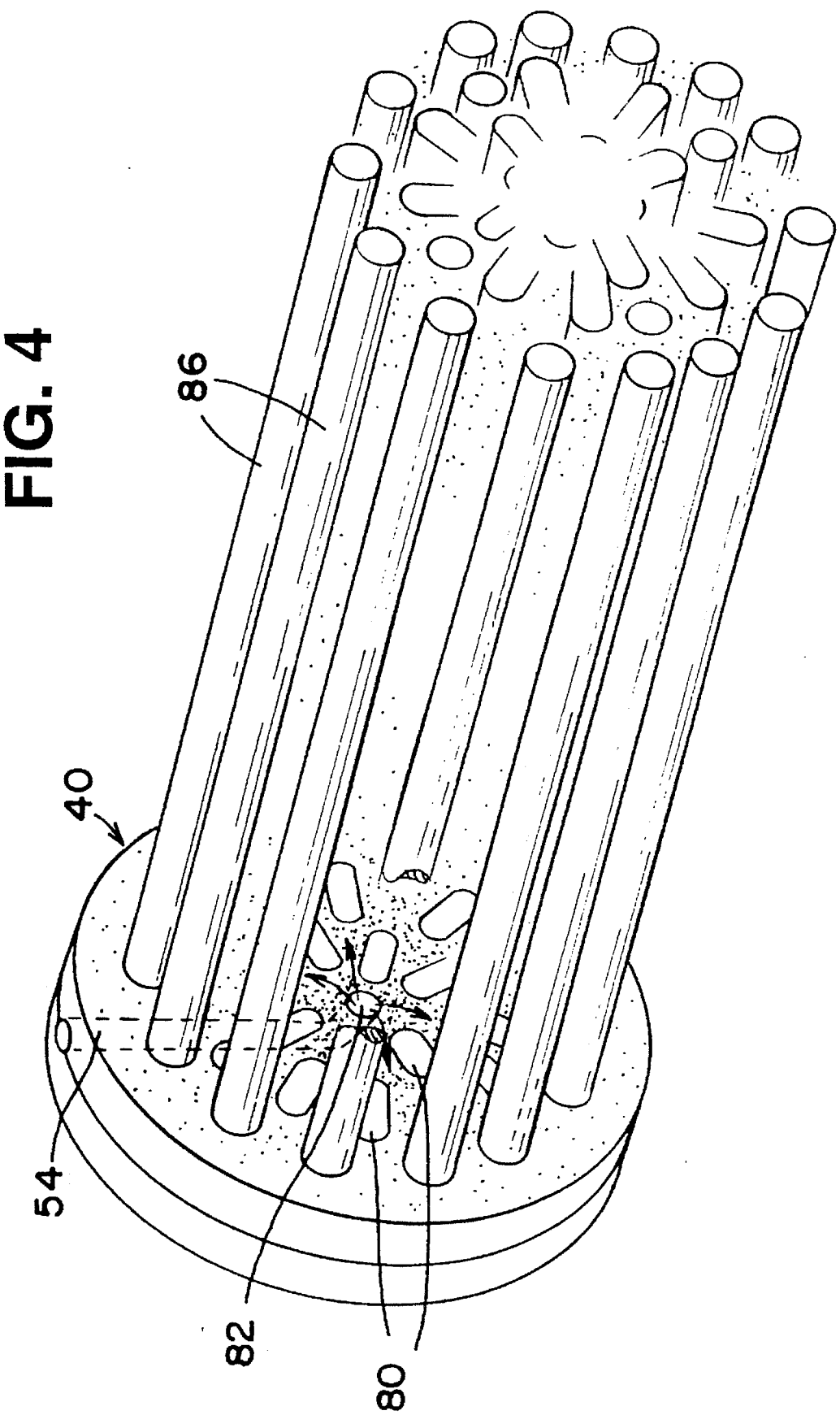
FIG. 4 illustrates the effects of the segmenting and additive addition concept of the present invention.

FIG. 4 illustrates substance exit from plate 40 of a portion of the disrupted, segmented substance flow forming the substance matrix and also illustrates discharge and distribution of an additive which is discharged from a substantially centrally disposed portion of plate 40 into the segmented substance flow. Additive eddies and percolates between segmented substance portions 86 which tend to confine additive, and a portion of additive shadows the solid portion of the downstream plate face from which the segmented substance exits. As will be appreciated, the surfaces of the segmented substance portions, particularly those in regions displaced away from the central portion of the flow, wipe additive shadowing the plate face from the face to provide a downstream vector to the shadowing additive, thus reducing the amount of additive migrating to the outer portion of the plate.

As will be appreciated, as the number of plate aperture passages is increased, the amount of segmented portion wiping action is increased. Thus, it is desired to provide the plate with a multiplicity of passages having open areas wherein the individual passage openings have an open area which may be even less than about 1% of total open area and range up to about 5%, or more, of open area, but preferably, such ranges only about up to about 3% of total open area. As will be appreciated, as the size of individual passages is increased, pressure drop caused also will be decreased, and such may be adapted and modified with regard to the materials being combined and mixed.

Figure 5:
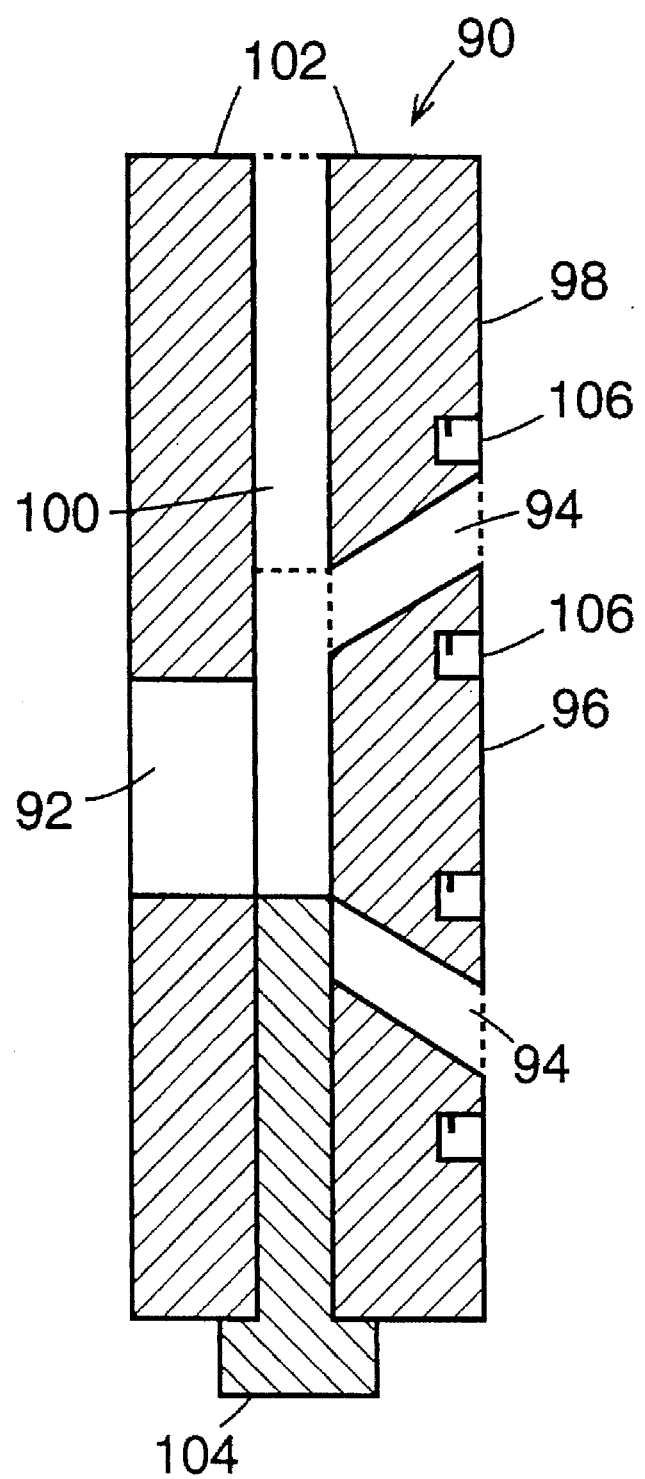
FIG. 5 illustrates a side elevation section view of an embodiment of a partitioning valve plate means.

As an alternative to the partitioning means illustrated in FIGS. 1 and 2, an embodiment as illustrated in FIG. 5, referred to above as the first partitioning embodiment, may be employed. The valved arrangement of this embodiment is contained in plate 90 which has a recess 92 from which a plurality of bores 94 extend at an angle with respect to a central axis of the recess radially about central plate solid portion 96 to openings radially spaced in plate face 98. Associated with each bore 94 is a further bore 100 which extends from plate edge 102 in a direction substantially perpendicular to the central axis of the plate faces and of recess 92 to communicate with bore 94. A valve 104 is positioned in each bore 100 to enable closing bore 94 to flow of substance. Apertures 106 are provided for affixing downstream apparati.

EXAMPLES

The following Examples are presented also for illustrative purposes.

Example I

Dry ingredients including ground corn and wheat, animal meat meal, minerals, vitamins, fat and salt are combined in amounts conventionally employed to prepare a dry extrusion-cooked pet food. The ingredients are ground, and then, the ground mixture is treated with steam and water in a continuous fashion to heat and moisten the mix. The treated mix has a temperature of about 90° C. and a moisture content of about 23%.

The treated mixture is introduced in a continuous fashion into a co-rotating twin-screw extruder heated to provide temperatures on the order of up to 120° C. as the mix is kneaded and moves downstream in the extruder, and a pressure of from about 50 bar is generated in the extruder.

A discharge end of the twin-screw extruder is integrated with an assembly, as depicted in the drawing Figures and described above, which partitions the extrudate into four separate streams and then treats the streams as described above.

A solution of an FD&C red colorant having a solids concentration of about 2% by weight is heated to about 90° C. and then pumped under pressure to the bored segmentation/additive introduction means of one line. Tallow is heated to about 55° C. and then pumped under pressure to a bored segmentation/additive introduction means of a second line. Carbon-dioxide is pumped under pressure to a bored segmentation/additive introduction means of a third line. A solution containing an FD&C yellow colorant and a Maillard reaction product chicken flavorant is fed under pressure to a bored segmentation/additive introduction means of a fourth line.

Each partitioned flow of extrudate is segmented as described above, and the additives are introduced into the segmented extrudate as described above, and then the extrudate/additive combination in each line is compressed and then expanded, and the expanded material is passed through static mixing elements. The mixed extrudate/additive is directed from the mixers to dies having differing shapes, and the extruded product from each line is cut to differing lengths by separately operated cutting devices, after which the cut product is dried so that the product has a moisture content which provides for a product which is microbiologically stable.

In addition to having differing shapes and dimensions, the products also provide differences in color, density and texture, and the additives are substantially uniformly distributed throughout the products.

Example II

Pellets of polypropylene are fed to a counter-rotating twin screw extruder which is preheated to provide a temperature of about 210° C. and which effects, upon extrusion, a pressure of about 200 bar. An assembly, as described above and depicted in the drawing Figures is integrated with the discharge end of the extruder. Differing colorants are pumped to each of the bored segmentation/additive introduction means, and after compression and expansion, the plastic/additive matrix is fed through heat-transfer static mixers through which cooling fluid circulates and then through cooled circular dies to form pipes which, because of the differing additives, have different colors.

As is clear from the foregoing, various modifications of the present invention may be made without departure from the spirit and scope of the disclosure, and the invention may be embodied and/or practiced suitably in the absence of elements or members and/or process steps not specifically disclosed herein.

We claim:

1. A process for treating fluid materials comprising:
   directing a flow of a fluid substance, other than a gas, to an apertured plate means and passing the flow through the apertured plate means, wherein the plate means has a plurality of apertures which extend between opposing plate faces for providing passages through the plate means and which are positioned about a centrally disposed plate portion, for segmenting the fluid substance flow into a plurality of substance segment portions and forming a segmented substance matrix flow wherein the plurality of substance segment portions confine a network of voids;
   discharging a fluid additive into the segmented substance matrix flow at a position which is substantially centrally disposed with respect to a cross-section of the segmented substance matrix flow for introducing the additive into the network of voids to obtain a combined substance and additive flow;
   compressing the combined substance and additive flow for obtaining a compressed flow to obtain a combined substance and additive fluid product; and
   mixing the fluid product.

2. A process according to claim 1 further comprising, prior to mixing, allowing the compressed flow of the fluid product to expand in cross-sectional area to obtain an expanded fluid product and then mixing the expanded fluid product.

3. A process according to claim 1 wherein the additive is discharged from an opening disposed in the plate face adjacent the segmented substance matrix flow.

4. A process according to claim 1 wherein the fluid substance flow is segmented for forming the plurality of substance segment portions so that the portions passing through the plate passages individually have a cross-sectional area of up to about 5% of a cross-sectional area of the fluid substance flow.

5. A process according to claim 4 wherein a total cross-sectional area of the substance segment portions which pass through the plurality of plate passages is from about 20% to about 50% of the fluid substance flow cross-sectional area.

6. A process according to claim 1 wherein the fluid substance is an extrudate material.

7. A process according to claim 6 wherein the extrudate material is an extrusion-cooked food composition.

8. A process according to claim 1 wherein a flow of the fluid product is mixed statically.

9. A process for treating fluid materials comprising:
   directing a flow of a fluid substance, other than a gas, against a protrusion for directing the fluid substance flow to passages for partitioning the flow into at least two separate fluid substance flow streams; and
   with regard to at least one of the separate flow streams,
      directing the flow stream to an apertured plate means and passing the flow stream through the apertured plate means, wherein the plate means has a plurality of apertures which extend between opposing plate faces for providing passages through the plate means and which are positioned about a centrally disposed plate portion, for segmenting the flow stream into a plurality of substance segment portions and forming a segmented substance matrix flow wherein the plurality of substance segment portions confine a network of voids;
      discharging a fluid additive into the segmented substance matrix flow at a position which is substantially centrally disposed with respect to a cross-section of the segmented substance matrix flow for introducing the additive into the network of voids to obtain a combined substance and additive fluid product; and mixing the fluid product.

10. A process according to claim 9 further comprising prior to partitioning, extruding a fluid substance for forming an extrudate flow for forming the flow of the fluid substance.

11. A process according to claim 10 further comprising extruding the fluid substance with a screw extruder and converging the extrudate flow to mute lateral flow of the extrudate for forming the flow of the fluid substance.

12. A process according to claim 9 wherein the fluid substance is a food product composition and further comprising extrusion-cooking ingredients for preparing the food product composition and extruding the composition for forming the flow of the fluid substance food product composition.

13. A process according to claim 9 further comprising, prior to mixing, compressing a flow of the fluid product to a reduced cross-sectional area to obtain a compressed fluid product and then mixing the compressed fluid product.

14. A process according to claim 9 further comprising, prior to mixing, compressing a flow of the fluid product to a reduced cross-sectional area to obtain a compressed flow of the fluid product and then allowing the compressed flow to expand in cross-sectional area to obtain an expanded fluid product and then mixing the expanded fluid product.

15. A process according to claim 9 wherein the additive is discharged from an opening in the plate face adjacent the segmented substance matrix flow.

16. A process according to claim 9 wherein the fluid substance flow is segmented for forming the plurality of substance segment portions so that the portions passing through the plate passages individually have a cross-sectional area of up to about 5% of a cross-sectional area of the flow stream.

17. A process according to claim 16 wherein a total cross-sectional area of the substance segment portions passing through the plurality of plate passages is from about 20% to about 50% of the flow stream cross-sectional area.

18. A process according to claim 9 wherein a plurality of separate flow streams are segmented to form a plurality of separate segmented substance matrix flows into which the additive is discharged to obtain a plurality of separate flows of fluid product and separately mixing the separate fluid products.

19. A process according to claim 18 wherein the additive discharged into at least one of the plurality of segmented substance matrix flows is different from the additive discharged into at least one other of the plurality of segmented substance matrix flows.

20. A process according to claim 9 wherein a flow of the fluid product is mixed statically.

21. A process for treating fluid materials comprising:

extruding a fluid substance from an extruder discharge end for forming an extrudate flow;

converging extrudate flow to mute lateral flow of the extrudate to obtain a converged flow;

partitioning the converged flow into at least two separate fluid substance flow streams; and with regard to at least one of the separate flow streams, directing the flow stream to an apertured plate means and passing the flow stream through the apertured plate means, wherein the plate means has a plurality of apertures which extend between opposing plate faces for providing passages through the plate means and which are positioned about a centrally disposed plate portion, for segmenting the flow stream into a plurality of substance segment portions and forming a segmented substance matrix flow wherein the plurality of substance segment portions confine a network of voids;

discharging a fluid additive into the segmented substance matrix flow at a position which is substantially centrally disposed with respect to a cross-section of the segmented substance matrix flow for introducing the additive into the network of voids to obtain a combined substance and additive fluid product; and mixing the fluid product.

22. A process according to claim 21 wherein the converged flow is directed against a protrusion for directing the converged flow to passages for partitioning.

23. A process according to claim 21 further comprising extrusion-cooking food ingredients so that the fluid substance extruded is an extrusion-cooked food composition.

24. A process according to claim 21 further comprising, prior to mixing, compressing a flow of the fluid product to a reduced cross-sectional area to obtain a compressed fluid product and then mixing the compressed fluid product.

25. A process according to claim 21 further comprising, prior to mixing, compressing a flow of the fluid product to a reduced cross-sectional area to obtain a compressed flow of the fluid product and then allowing the compressed flow to expand in cross-sectional area to obtain an expanded fluid product and then mixing the expanded fluid product.

26. A process according to claim 21 wherein the additive is discharged from an opening in the plate face adjacent the segmented substance matrix flow.

27. A process according to claim 21 wherein the fluid substance flow is segmented for forming the plurality of substance segment portions so that the portions passing through the plate passages individually have a cross-sectional area of up to about 5% of a cross-sectional area of the flow stream.

28. A process according to claim 27 wherein a total cross-sectional area of the substance segment portions passing through the plurality of plate passages is from about 20% to about 50% of the flow stream cross-sectional area.

29. A process according to claim 21 wherein a plurality of separate flow streams are segmented to form a plurality of separate segmented substance matrix flows into which the additive is discharged to obtain a plurality of separate flows of fluid product and separately mixing the separate fluid products.

30. A process according to claim 29 wherein the additive discharged into at least one of the plurality of segmented substance matrix flows is different from the additive discharged into at least one other of the plurality of segmented substance flows.

31. A process according to claim 21 wherein a flow of the fluid product is mixed statically.

* * * * *